United States Patent
Sjolund et al.

(10) Patent No.: US 12,293,475 B2
(45) Date of Patent: May 6, 2025

(54) APPARATUS AND METHOD FOR EARBUD AUGMENTED REALITY

(71) Applicant: 3M INNOVATIVE PROPERTIES COMPANY, St. Paul, MN (US)

(72) Inventors: Lori A. Sjolund, Stillwater, MN (US); Christopher M. Brown, Cottage Grove, MN (US); Glenn E. Casner, Woodbury, MN (US); Jon A. Kirschhoffer, Stillwater, MN (US); Kathleen M. Stenersen, St. Paul, MN (US); Miaoding Dai, Woodbury, MN (US); Travis W. Rasmussen, Rosemount, MN (US); Carter C. Hughes, River Falls, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 77 days.

(21) Appl. No.: 18/012,625

(22) PCT Filed: Jun. 15, 2021

(86) PCT No.: PCT/IB2021/055252
§ 371 (c)(1),
(2) Date: Dec. 22, 2022

(87) PCT Pub. No.: WO2022/003465
PCT Pub. Date: Jan. 6, 2022

(65) Prior Publication Data
US 2023/0252731 A1     Aug. 10, 2023

Related U.S. Application Data

(60) Provisional application No. 62/705,490, filed on Jun. 30, 2020.

(51) Int. Cl.
*G06T 19/00* (2011.01)
*G06F 3/01* (2006.01)
*H04R 1/10* (2006.01)

(52) U.S. Cl.
CPC ............ *G06T 19/006* (2013.01); *G06F 3/016* (2013.01); *H04R 1/1016* (2013.01)

(58) Field of Classification Search
CPC ...... G06T 19/006; G06F 3/016; H04R 1/1016
See application file for complete search history.

(56) References Cited

U.S. PATENT DOCUMENTS

| 6,714,233 B2 | 3/2004 | Chihara et al. |
| 8,237,856 B2 | 8/2012 | Boland et al. |

(Continued)

FOREIGN PATENT DOCUMENTS

| KR | 20160049191 A | 5/2016 |
| WO | 2019225192 A1 | 11/2019 |

OTHER PUBLICATIONS

"Introducing a new self-help approach to better hearing", Nuheara Limited [online], 2021, [retrieved from the internet on Feb. 22, 2023], URL <https://www.nuheara.com/>, pp. 17.

(Continued)

*Primary Examiner* — Terrell M Robinson
(74) *Attorney, Agent, or Firm* — Sriram Srinivasan; Yufeng Dong

(57) ABSTRACT

Augmented reality (AR) devices, systems and methods are provided to argument captured images of objects of interest. Image data can be obtained for an object of interest by an imaging device of an ear-worn device worn by a user. Augmenting information is generated to augment onto an image of the object. The augmented image is adjusted based on the detection on whether the object is in a field of view (FOV) of the imaging device.

16 Claims, 4 Drawing Sheets

(56) References Cited

U.S. PATENT DOCUMENTS

| | | | |
|---|---|---|---|
| 2015/0185855 A1* | 7/2015 | Elak | G06F 3/011 |
| | | | 345/156 |
| 2015/0193664 A1* | 7/2015 | Marti | G08B 21/06 |
| | | | 382/103 |
| 2015/0310667 A1 | 10/2015 | Young et al. | |
| 2016/0033280 A1 | 2/2016 | Moore | |
| 2016/0088287 A1 | 3/2016 | Sadi et al. | |
| 2017/0078825 A1 | 3/2017 | Mangiat et al. | |
| 2018/0063625 A1* | 3/2018 | Boesen | G06F 3/167 |
| 2018/0136035 A1* | 5/2018 | Holzl | G01H 9/00 |
| 2019/0260982 A1 | 8/2019 | Hua et al. | |
| 2019/0362646 A1* | 11/2019 | Hsu | B23K 9/0956 |
| 2019/0370532 A1* | 12/2019 | Soni | H04N 23/611 |
| 2021/0216773 A1* | 7/2021 | Bohannon | G06V 20/20 |
| 2024/0053612 A1* | 2/2024 | Robaina | B60K 35/60 |

OTHER PUBLICATIONS

International Search Report for PCT International Application No. PCT/IB2021/055252, mailed on Sep. 6, 2021, 3 pages.

Video: "Eyebud Nokia", Bell Labs Sep. 2018, URL <https://www.youtube.com/watch?v=I9dhN2dVI3k>00:04:03 HRS.

Extended European Search Report, EP 21 83 4544, dated Jun. 6, 2024, 2 pages.

\* cited by examiner

APPARATUS AND METHOD FOR EARBUD AUGMENTED REALITY

CROSS-REFERENCE TO RELATED APPLICATIONS

This application is a national stage filing under 35 U.S.C. § 371 of International Application No. PCT/IB2021/055252, filed 15 Jun. 2021, which claims the benefit of Provisional U.S. Patent Application No. 62/705,490, filed 30 Jun. 2020, the entire disclosure of each of which is incorporated herein by reference.

BACKGROUND

Wearable devices, such as smart watches, are becoming more prevalent. Similarly, augmented reality in phones or wearable headsets are predicted to become increasingly common.

SUMMARY

There is a desire to pair an ear-worn device with a camera for augmented reality. The present disclosure provides devices, systems and methods for augmented reality applications.

In one aspect, the present disclosure describes a computer-implemented method for augmented reality (AR). The method includes obtaining, via an imaging device of an ear-worn device worn by a user, image data for an object of interest; generating, via a processor, an augmented image comprising generating augmenting information to be augmented onto an image of the object from the image data; detecting whether the object is in a field of view (FOV) of the imaging device; and adjusting the augmented image based on results of the detection.

In another aspect, the present disclosure describes an ear-worn augmented reality (AR) device. The device includes an imaging device to image data for an object of interest; a processor to receive the image data, and configured to: generate an augmented image comprising generating augmenting information to be augmented onto an image of the object from the environmental image data; determine whether the object is in a field of view (FOV) of the imaging device; and adjust the augmented image based on results of the detection. The device further includes a delivery component to deliver the augmenting information to a user wearing the ear-worn AR device.

In another aspect, the present disclosure describes an augmented reality (AR) system embodied on a computer-readable storage medium. The system includes an image processing component to receive and process image data for an object of interest from an imaging device to generate an image of the object; a data interface component to receive sensor data from one or more sensors; an augmenting component to generate augmenting information to augment the image of the object, the augmenting information including at least one of visual information, or auditory information; a display component to overlay the visual information to the image of the object; and a notification component to deliver the auditory information to a notification device.

Various unexpected results and advantages are obtained in exemplary embodiments of the disclosure. Advantages of exemplary embodiments of the present disclosure include, for example, an automatic detection of objects of interest in front of a wearer of an ear-worn device, an automatic detection of a change of the wearer's view, and an automatic notification/adjustment upon the detections.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which.

Figure 1:
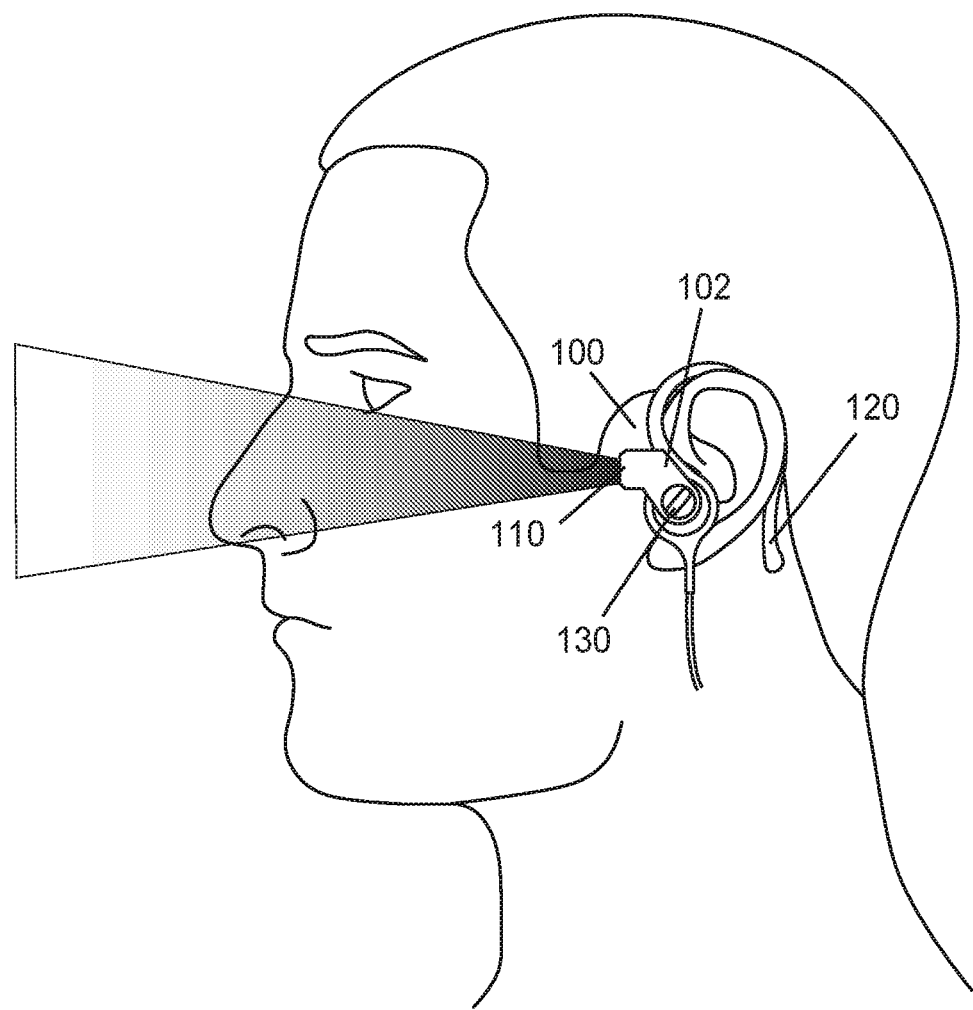
FIG. 1 is a schematic diagram of an ear-worn device worn by a user, according to one embodiment.

In the drawings, like reference numerals indicate like elements. While the above-identified drawing, which may not be drawn to scale, sets forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

The present disclosure provides devices, systems and methods for augmented reality applications. Image data can be obtained for an object of interest by an imaging device of an ear-worn device worn by a user. Augmenting information is generated to augment onto an image of the object. The augmented image is adjusted based on the detection on whether the object is in a field of view (FOV) of the imaging device. The augmented image including an image of the object and its augmenting information is delivered to the wearer via a display device and other suitable notification devices.

FIG. 1 is a perspective side view depicting an ear-worn device worn by a user. The ear-worn device depicted in the embodiment of FIG. 1 is a one-piece earbud 100 mounted on the user's ear via a mounting mechanism 120. The earbud 100 includes a housing 102 to receive functional components. Exemplary functional components include auditory and visual components such as a speaker, a microphone, a camera, etc., control components such as a microprocessor, communication components such as a wired or wireless module, user response/control/feedback components such as a button 130, etc. The earbud 100 can be functionally connected to wired or wirelessly networked devices such as, for example, a cellphone, a smart watch, a display, etc.

The earbud 100 includes an imaging device 110 (e.g., a camera) received by the housing 102. When the earbud 100 is worn by the user, the camera 110 points forward and can obtain image data for any object of interest in the scene in front of the user. The captured image can be displayed to the user via a display device paired with the earbud 100. Augmenting information (e.g., visual, auditory, or tactile information related to the object, the environment or the user's state) can be delivered to the user along with the image of the object to augment the user's experience.

The camera 110 can be a wide field-of-view (FOV) camera. The field-of-view (FOV) or angle of view (AOV) describes the angular extent of a given scene that is imaged by a camera. The camera 110 can capture a wide angular extent of the scene in front of the user such that when the user tilts the head (e.g., to look at a display), the object of interest may still be within the FOV of the camera. The camera 110 can have a diagonal angle of view, for example, no less than 70 degrees, no less than 80 degrees, no less than 90 degrees, or no less than 100 degrees.

Figure 2:
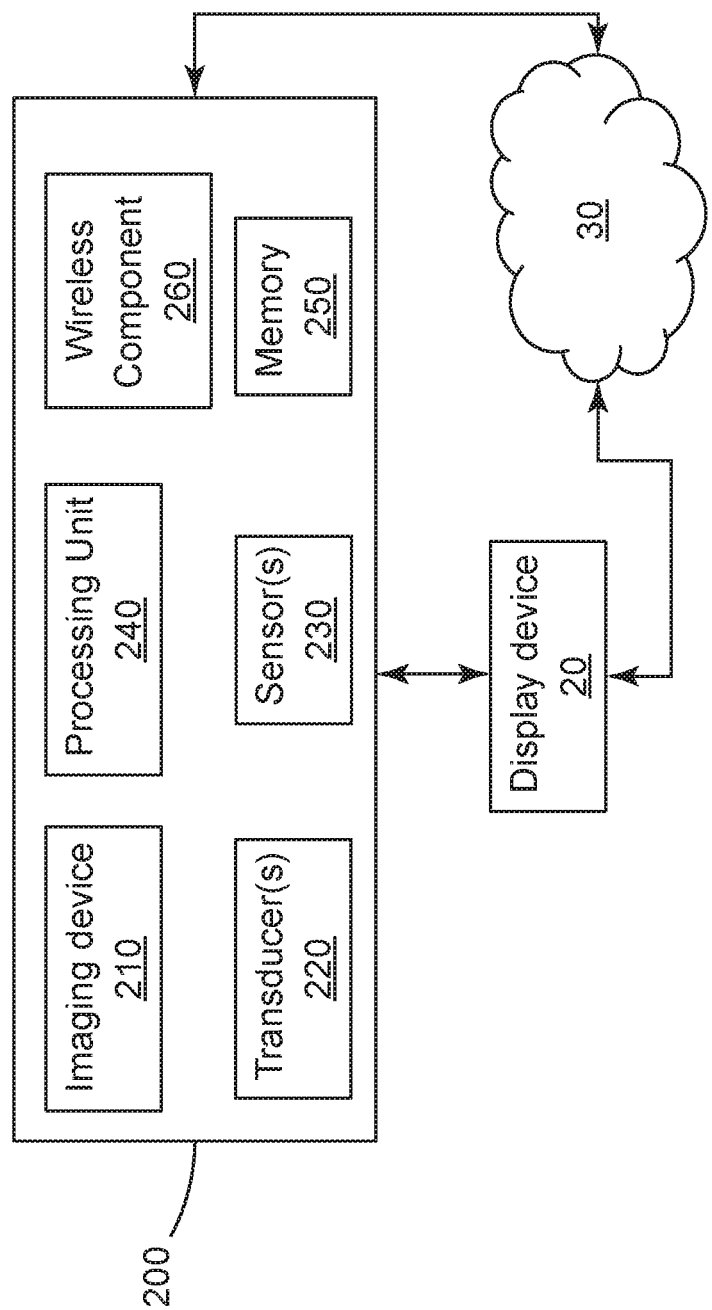
FIG. 2 is a block diagram illustrating an ear-worn device 200 paired with a display device in a network environment, according to one embodiment.

FIG. 2 is a block diagram illustrating an ear-worn device 200 paired with a display device 20 in a network environment, according to one embodiment. The ear-worn device 200 can be in the form of one-piece structure such as the earbud 100 of FIG. 1 suitable for mounting adjacent to a user's ear. The ear-worn device 200 includes an imaging device 210 to capture image data for the scenes in front of the wearer. The imaging device 210 can include, for example, a wide FOV camera 110 of FIG. 1.

The ear-worn device 200 further includes one or more transducers 220 to deliver image-augmenting information or notifications to a user and/or receive instructions/responses from the user. Exemplary transducers 220 may include a speaker, a microphone, a tactile device, etc. The speaker can deliver auditory information to augment the displayed image, or deliver other notifications to the user. The tactile device can be a device that vibrates or provides other types of haptic notification. The microphone can receive the user's response/instruction and/or ambient auditory information (e.g., noise). It is to be understood that one or more of the transducers 220 may be located at another wearable device worn by the wearer or a remote device disposed in the environment, which is paired with the ear-worn device 200.

The ear-worn device 200 may further include one or more optional sensors 230 to detect the state of the wearer. The optional sensors 230 may include, for example, an inertial measurement unit (IMU), a heartrate device, a galvanic skin response device, a thermal sensor, a satellite-based navigation device, etc. It is to be understood that the optional sensors 230 may be located at the ear-worn device 200, located at another wearable device (e.g., a watch, a phone, glasses, etc.) worn by the wearer and paired with the ear-worn device 200, and/or located at wireless-enabled sensing stations in a work environment to detect hazards/environment. The measured data from the sensors 230 can be used to indicate a status of the wearer.

In some embodiments, an IMU sensor can be used to detect a body movement of the user. An inertial measurement unit (IMU) may include a gyroscope and an accelerometer. The gyroscope can sense rotation data by measuring the angular velocities (e.g., radians per second) around three axes such as x, y, and z axes. The accelerometer can measure linear accelerations (e.g., meter per second squared) along the x, y, and z axes. In some embodiments, the accelerometer can measure an acceleration due to Earth's gravity and provide a gravity reference to the rotation data measured by the gyroscope.

In some embodiments, a change of a user's viewing angle can be detected by an IMU. The IMU can be located at the ear-worn device to measure the angular velocities and linear accelerations of the user's head. The measured IMU data can be processed to determine the change of a user's viewing angle. For example, when the user tilts the head down from the object of interest to looking at a display device, the IMU can detect the head tilt and determine the change of the user's viewing angle. It is to be understood that additional translation and rotation information of the user can be obtained and combined with the IMU data to get more accurate estimates of translation and orientation information of the user's head.

The sensors 230 can also include sensors for capturing data that is indicative of a user's attributes such as, for example, aspects of biological state, psychological state, personality traits, and the current demands on the user's perceptual systems including different modalities such as, for example, visual and auditory systems. For example, one or more temperature measurement devices can be provided to detect a user's body temperature which may provide information, when combined with other biological measurements (e.g., galvanic skin response), indicating the physical, emotional, or engagement state of the user.

The ear-worn device 200 further includes a processing unit or processor 240 to receive and process various data from the imaging device 210, the transducers 220, the sensors 230, and other components of ear-worn device or other devices paired with the ear-worn device. The processing unit 240 can be a processor or a computing device including, for example, one or more general-purpose microprocessors, specially designed processors, application specific integrated circuits (ASIC), field programmable gate arrays (FPGA), a collection of discrete logic, and/or any type of processing device capable of executing the techniques described herein.

The ear-worn device 200 further includes a memory component 250. The memory component 250 can be any suitable type of computer-readable storage medium which can store instructions for performing the methods or processes described herein. The computer-readable storage medium may include any volatile or non-volatile storage elements. Examples may include random access memory (RAM) such as synchronous dynamic random access memory (SDRAM), read-only memory (ROM), non-volatile random access memory (NVRAM), electrically erasable programmable read-only memory (EEPROM), and FLASH memory. Examples may also include hard-disk, magnetic tape, a magnetic or optical data storage media, a compact disk (CD), a digital versatile disk (DVD), a Blu-ray disk, and a holographic data storage media. Examples may also include hard-disk, magnetic tape, a magnetic or optical data storage media, a compact disk (CD), a digital versatile disk (DVD), a Blu-ray disk, and a holographic data storage media.

The ear-worn device 200 is paired with a display device 20 and connected to a network 30 via a wireless component 260 thereof. The communications between the devices and the network 30 may be a short-range wireless communication which is configured with wireless technology, such as 802.11 wireless networks, 802.15, ZigBee networks, Bluetooth protocol or the like. In some embodiments, the system may provide one or more wireless access points that may be geographically distributed in a work environment to provide support for wireless communications throughout the work environment.

When the imaging device 210 detects augmentable objects of interest, the ear-worn device 200 can provide augmenting information (e.g., visual information, auditory notification, haptic notification, etc.) while displaying the images of objects via the display device 20 to augment the user's experience. For example, when the ear-worn device detects a specific location, or a specific item of potential interest, it can determine whether the item is of interest to the user based on the user's preference settings, user history, and/or user context. The user's preference settings and user history data can be retrieved from the memory component 250. The contextual information can be detected, for example, by sensors attached to the user or distributed in the environment. Based on these settings and/or context, the device can send a notification to the user that there is augmentable content and provide the content, either automatically or on prompt from the user, through the modality (e.g., visual AR, auditory, or haptic) that is most useful to the user in that situation.

Figure 3:
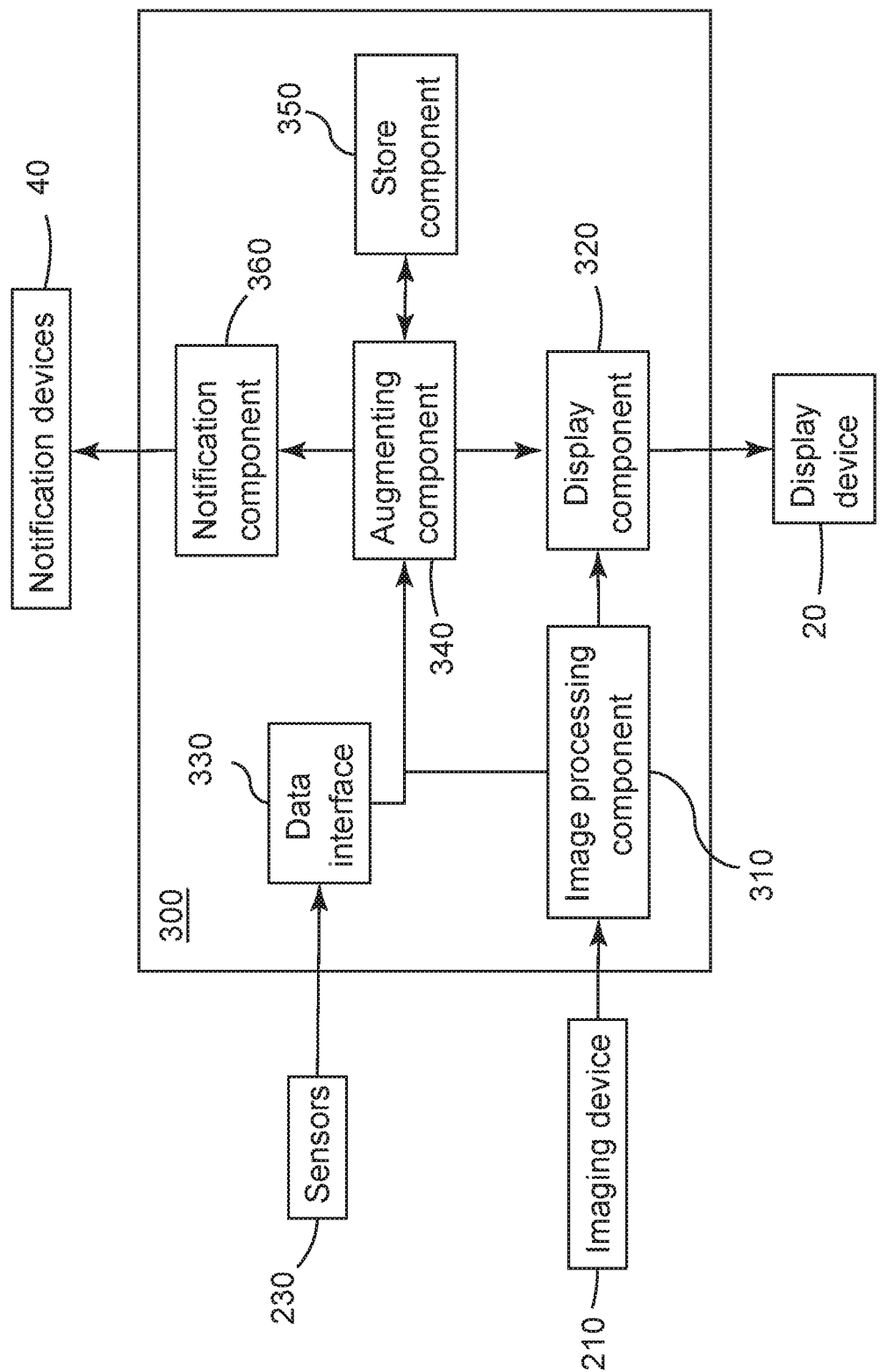
FIG. 3 is a block diagram illustrating an augmented reality (AR) system making use of an ear-worn device paired with a display device, according to one embodiment.

FIG. 3 is a block diagram illustrating an augmented reality (AR) system 300 to operate an ear-worn device paired with a display device, according to one embodiment. The AR system 300 can be implemented by a computing device such as the processing unit 240 of FIG. 2. The AR system 300 may also be embodied on a computer-readable storage medium which can store instructions for performing the methods or processes described herein.

The AR system 300 includes an image processing component 310 to receive and process the image data from the imaging device 210. In some embodiments, the image processing component 310 can automatically recognize and mark the object of interest in the captured image. In some embodiments, the image processing component 310 may receive feedback from the user to define the FOV of interest or the object of interest in the captured image. For example, a user interface may be provided such that the user can act on the displayed image to identify the FOV of interest or the object of interest. The processed imaged data from the image processing component 310 can be sent to a display component 320 where the processed imaged data can overlay with augmenting information from an augmenting component 340 to generate augmented images to be displayed by the display device 20.

The AR system 300 further includes a sensor data interface component 330 configured to receive sensor data from the sensors 230 of FIG. 2. The sensor data may include various contextual information including real-time information collected from one or more environmental sensors and user sensors. The received sensor data can be sent to the augmenting component 340 to generate augmenting information. In some embodiments, the sensor data can be analyzed to infer different user states which can be used to alter the type and/or number of notifications to be delivered to the user.

The AR system 300 further includes a store component 350 to store information including, for example, user preference information, trigger events information, user history data, etc. The user preference information can define what type of information a user would like to present in terms of augmenting information (e.g., additional information) to be delivered along with the captured image of an object of interest. Examples may include object identity, product description, uses, costs, thermal information, statistical information such as differences between current example and typical example, alternative views, previous or future views, etc. The user preference information may be specified in a user profile (e.g., preferences settings) or be specified for specific sessions and/or events. Trigger events information may define various triggering events including, for example, the detection of certain classes of objects or detection of certain individuals, GPS coordinates, detection of certain markers (such as barcodes), user gestures, user interaction with an input device (e.g., a keyword, a touch screen, a button, etc.).

The AR system 300 further includes the augmenting component 340 configured to receive relevant data from the data interface component 330, the image processing component 310, and the store component 350 to generate augmenting information to augment the captured image from the image processing component 310. The generated augmenting information may include, for example, (i) visual information to be sent to the display component 320 to overlay the captured image of object of interest; and (ii) notification information (e.g., auditory information) to be sent to the notification component 360 and delivered to a user via a notification device 40. The notification device 40 may include, for example, a speaker to deliver auditory information, a tactile device that vibrates or provides other types of haptic notification, etc.

Figure 4:
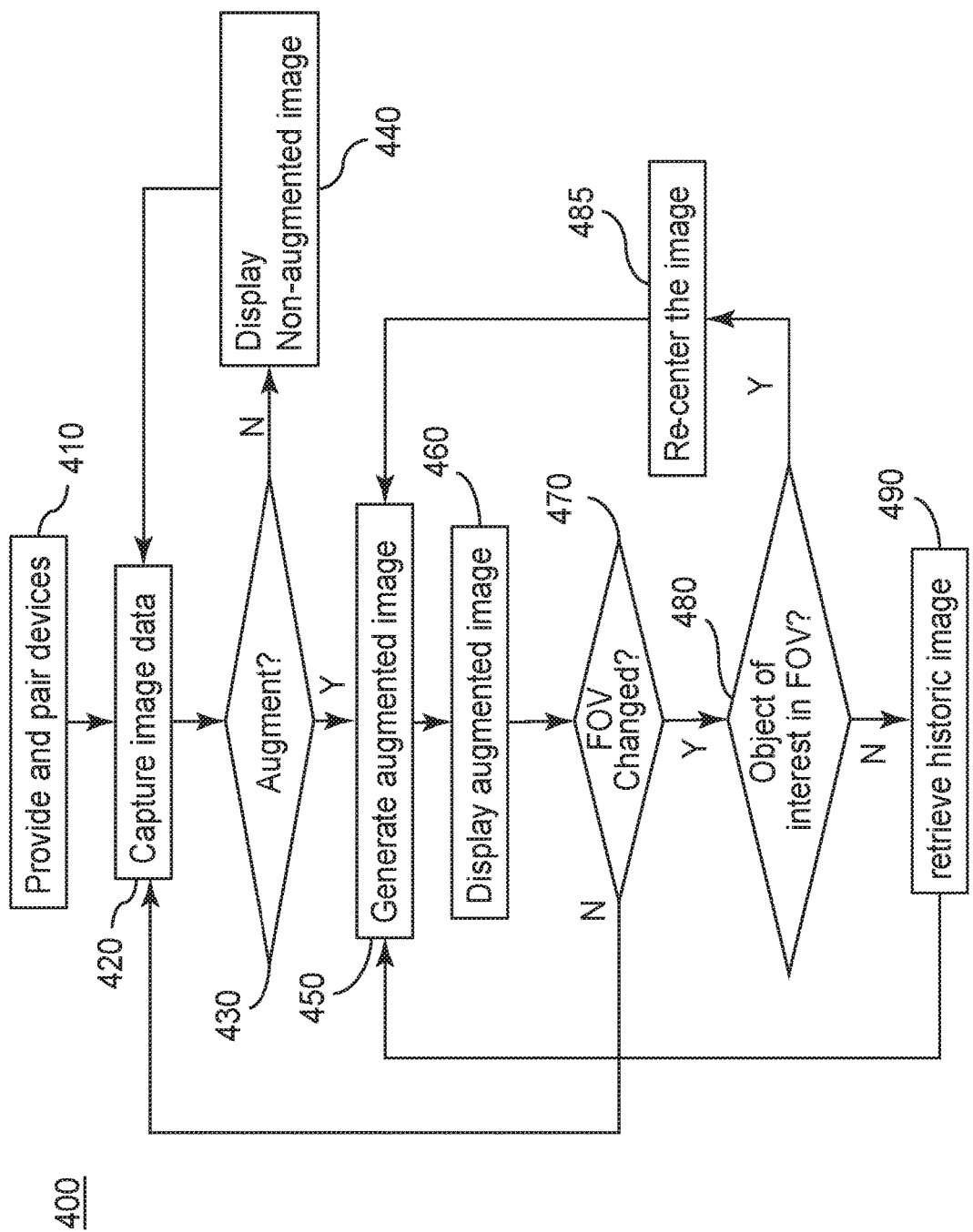
FIG. 4 is a block diagram illustrating a method of augmented reality (AR) making use of an augmented reality (AR) system, according to one embodiment.

FIG. 4 is a block diagram illustrating a method 400 of augmented reality (AR) using the augmented reality (AR) system 300, according to one embodiment. At 410, an ear-worn device and a display device are provided and paired with each other. The ear-worn device can be an earbud described herein such as the earbud 100 of FIG. 1. The display device can be provided by any wired or wirelessly networked device including for example, a cellphone, a smart watch, a display, etc. The ear-worn device may also be paired with sensors of a networked device (e.g., a cellphone, a smart watch, etc.). For example, the networked device may include sensors such as, for example, an inertial measurement unit (IMU), a heartrate device, a galvanic skin response device, a thermal sensor, and/or a satellite-based navigation device. The ear-worn device can obtain sensor data from the sensors of the networked device. In some embodiments, a user interface may be provided and displayed by the display device. The user interface may provide user identification and authentication with the ear-worn device and the display device. The method 400 then proceeds to 420.

At 420, the imaging device 210 starts to capture real-time image data for the scenes in the user's environment. The image data can include still image data, streaming image data, video, or other forms of image data. The images captured by the imaging device 210 may be a wide angle of view (AOV) image for the scenes in front of the user. The method 400 then proceeds to 430.

At 430, the image processing component 310 receives the captured image data from the imaging device 210, processes the image data, and communicates with the augmenting component 340 to determine whether to augment the captured image to be displayed by the display device 20. The determination to augment the image may be triggered by one or more triggering events. In some embodiments, a triggering event can be detected by processing the captured image. Examples of triggering events may include, for example, the detection of certain classes of objects such as certain individuals, certain products, certain markers (such as barcodes) in the captured image for the environment. In some embodiments, the triggering event may be detected by sensors of the system paired with the ear-worn device. For example, the triggering event may be GPS coordinates of the user's location. In some embodiments, triggering events may be a user input such as a user gesture detected by a camera, an interaction with a connected device such as a keyword, etc. When the augmenting component 340 determines not to augment the image, the method 400 then proceeds to 440. When the augmenting component 340 determines to augment the image, the method 400 then proceeds to 450.

At 440, the captured image without augmenting information is displayed to the user via the display device 20. The method 400 then proceeds to 420.

At 450, the augmenting component 340 generates augmenting information to be used to augment the captured image of the object of interest. The information or data used to augment the captured image or augmenting information can be visual information, auditory information, or other suitable forms of information that can be delivered to the user along with the displayed image of an object of interest. In some embodiments, the processing unit can access a store component of the system which stores information for various objects of interest to obtain the related information or augmenting information for the identified object. The method 400 then proceeds to 460.

At 460, the augmented image is delivered to a display device for displaying. The augmented image includes an image of the object of interest which is augmented by related information/data. In some embodiments, the augmenting information can be visual information which can overlay the image displayed by the display device. For example, the object of interest may be a certain product, e.g., disposed on a store shelf. The image of the product can be captured by the imaging device of the ear-worn device. Product information such as product name, product price, primary use, additional products frequently bought with the identified product, etc., can be augmented onto the image of the product on the store shelf. In some cases, the object of interest may be a worker wearing personal protective equipment (PPE) in a work environment. The image of the worker in the environment can be captured by the imaging device of the ear-worn device. Information of the identified worker such as worker name, job description, PPE identified, working status, etc., can be augmented onto the image of the worker in the work environment. The method 400 then proceeds to 470.

At 470, while the imaging device 210 keeps capturing real-time image data for the recognized object of interest, augmenting component 340 determines whether the user's viewing angle is changed. In some embodiments, the sensors 230 may include one or more IMUs to determine when the wearer has dropped the head and changed the FOV to look at a display device. An IMU can be located at the ear-worn device or other head-worn device. The data interface component 330 receives the signals from the IMU and send the signals to the augmenting component 340 to analyze the signal to determine whether the user's viewing angle has been changed.

In some embodiments, a change of the user's viewing angle can be determined by detecting whether the object is in the field of view via object detection, or by detecting a head movement of the user via visual features or optical flow. For example, the captured image can be analyzed to recognize fiducial markers from the environment, such as location of a floor, a ceiling, a tabletop, etc., and estimate the change of viewing angle from such fiducial markers. Another possible method might include estimating viewing angle changes based on object tracking (e.g., vie object detection and tracking) or based on optical flow analysis.

When the augmenting component 340 determines that the user's viewing angle has not been substantially changed, for example, not greater than a predetermined value, the method 400 then proceeds to 420. When the augmenting component 340 determines that the user's viewing angle has been changed greater than the predetermined value, the method 400 then proceeds to 480.

At 480, the image processing component 310 determines whether the object of interest is still within the field of view (FOV) of the camera. The image processing component 310 can analyze the real-time image of the scene in front of the user as captured by the camera to determine whether the object of interest is still in the real-time image. In some embodiments, the image processing component 310 can compare the change of the user's viewing angle and the camera's FOV to determine whether the object of interest is outside the FOV of the camera. When the image processing component 310 determines that the object of interest is still within the field of view (FOV) of the camera, the method 400 then proceeds to 485. When the image processing component 310 determines that the object of interest is not within the field of view (FOV) of the camera, the method 400 then proceeds to 490.

At 485, the image processing component 310 adjusts the captured image such that the object of interest is positioned substantially at the center of the image. The image can be re-centered by various image processing techniques such as, for example, image cropping, panning, straightening, un-distorting, etc. The re-centered image is then augmented with augmenting information to generate augmented images and sent to the display component 320. The method 400 then proceeds to 460.

At 490, the augmenting component 340 retrieves a historic image of the identified object of interest when the image processing component 310 determines that the object of interest is not within the field of view (FOV) of the camera. The historic image may be a previous image of the object of interest captured at the moment before the image processing component 310 determines that the object of interest is not within the field of view (FOV) of the camera. The historic image can be cached in the store component 350 and be retrieved upon the instruction from the augmenting component 340 or the image processing component 310. The retrieved historic image can be augmented with augmenting information at 450, which is then sent to the display component 320.

In some embodiments, when the object of interest is not within the field of view (FOV) of the camera, instead of retrieving a historic image of the identified object of interest at 490, the augmenting component 340 can generate a notification/instruction to deliver to the user such that the user can adjust the position of the camera to allow the object of interest returning to the field of view (FOV) of the camera.

The augmented reality (AR) devices, systems and methods described herein can have various applications. When an imaging device of an ear-worn device detects augmentable objects, the ear-worn device can provide augmenting information (e.g., visual information, auditory notification, haptic notification, etc.) while displaying the image of objects via a display device to augment the user's experience.

In some applications, an ear-worn device can detect an object of interest and monitor its surroundings. For example, the ear-worn device can provide auditory turn-by-turn directions to a pedestrian on foot when the device detects that wearer reaches a specific point in the route. The ear-worn device can also detect whether a user in an industrial setting is at a certain point in an assembly process or has completed an action incorrectly and provide auditory instruction for what they should do next. The AR devices, systems and methods described herein can improve both safety and productivity of industrial workers. For instance, the ear-worn device can detect hazards in the environment and provide warnings to the user through visual augmented reality, auditory alerts, or haptic alerts on a paired device such as a smartwatch, cellphone, or other display. In an example, an ear-worn device may detect the approach of a fork truck and warn the user of the upcoming hazard through visual, auditory, or haptic notification, based on the user's preferences and the given situation.

In some professions such as industrial, manufacturing, medical, and food safety, the ability to detect and a notify a user of additional environmental information hands-free is of utmost importance. The user may not be able to detect all the relevant environmental information without assistance and may not have the ability to use their hands to point a camera to help them detect critical information. The AR devices, systems and methods described herein can monitor surroundings and augments the information available to the user through various notifications (e.g., visual, auditory, tactile notifications) based on the user's settings and context, which can create increased worker and patient safety and efficacy.

The AR devices, systems and methods described herein can also be used to detect and augment interaction with consumer products. The augmented content can be used to provide the benefits of virtual shopping, such as access to user reviews, tutorials, and additional products of interest, in a physical store setting. In addition, the ear-worn device can provide reminders of products that the individual may need to purchase when they are near that location in a physical store.

In another application, medical personnel require access to information without the ability to take out another device for information access. In one example, a surgeon may require additional patient information or updated status information during surgery when their hands are busy. An ear-worn device described herein can be paired with a nearby display device (wearable or otherwise) to allow the surgeon to see important patient information overlaid on the surgery site so that they can best adapt to incoming information without interrupting their workflow. In some applications, various decision process (e.g., mathematical algorithms based on the AI/ML models) can be utilized to assist the AR devices, systems and methods described herein to identify anomalies such as previously undetected anomalies in the surgical site or problems within the surgical site, such as surgical instruments that require removal.

In a food safety application, the AR devices, systems and methods described herein can detect problem areas that may require additional cleaning to ensure food safety. For instance, various AI/ML models can be trained to analyze the captured image data to detect locations in the environment in which there is a high-risk for contaminants, such as room corners and cracks in surfaces. A heatmap of the areas of concern, i.e., an augmented environmental image, can be displayed via a paired display device. Additionally, this technology could be paired to a database of recent surface testing results and overlay these results over the real environment to assist in further cleaning of the trouble areas.

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Exemplary embodiments of the present disclosure may take on various modifications and alterations without departing from the spirit and scope of the present disclosure. Accordingly, it is to be understood that the embodiments of the present disclosure are not to be limited to the following described exemplary embodiments, but is to be controlled by the limitations set forth in the claims and any equivalents thereof.

LISTING OF EXEMPLARY EMBODIMENTS

Exemplary embodiments are listed below. It is to be understood that any one of embodiments 1-12, 13-17 and 18 can be combined.

Embodiment 1 is a computer-implemented method for augmented reality (AR), the method comprising:
  obtaining, via an imaging device of an ear-worn device worn by a user, image data for an object of interest;
  generating, via a processor, an augmented image comprising generating augmenting information to be augmented onto an image of the object from the image data;
  detecting whether the object is in a field of view (FOV) of the imaging device; and
  adjusting the augmented image based on results of the detection.

Embodiment 2 is the method of embodiment 1, wherein generating the augmenting information comprises generating a visual content to overlay the image of the object.

Embodiment 3 is the method of embodiment 1 or 2, wherein generating the augmenting information comprises generating a non-visual content including at least one of an auditory notification or a tactile notification to augment the image of the object.

Embodiment 4 is the method of any one of embodiments 1-3, wherein detecting whether the object is in the FOV of the imaging device comprises detecting a head movement of the user via an inertial measurement unit (IMU).

Embodiment 5 is the method of any one of embodiments 1-4, wherein adjusting the augmented image comprises re-centering the object in the image.

Embodiment 6 is the method of any one of embodiments 1-5, wherein adjusting the augmented image comprises augmenting the augmenting information onto a historic image of the object.

Embodiment 7 is the method of any one of embodiments 1-6, wherein adjusting the augmented image further comprises generating a notification to deliver to the user to adjust the field of view (FOV) of the imaging device.

Embodiment 8 is the method of any one of embodiments 1-7, further comprising delivering the augmented image to the user.

Embodiment 9 is the method of embodiment 8, wherein delivering the augmented image comprises displaying the image of the object overlaying visual augmenting information.

Embodiment 10 is the method of embodiment 8 or 9, wherein delivering the augmented image comprises delivering at least one of auditory or tactile notification while displaying the image of the object.

Embodiment 11 is the method of any one of embodiments 1-10, further comprising collecting user state data via one or more sensors, optionally, the sensors comprising at least one of a heartrate device, a galvanic skin response device, a thermal sensor, or a satellite-based navigation device.

Embodiment 12 is the method of embodiment 11, further comprising analyzing the user state data to generate augmenting information.

Embodiment 13 is an ear-worn augmented reality (AR) device comprising:
  an imaging device to image data for an object of interest;
  a processor to receive the image data, and configured to:
    generate an augmented image comprising generating augmenting information to be augmented onto an image of the object from the environmental image data; determine whether the object is in a field of view (FOV) of the imaging device; and
    adjust the augmented image based on results of the detection; and
  a delivery component to deliver the augmenting information to a user wearing the ear-worn AR device.

Embodiment 14 is the ear-worn AR device of embodiment 13, further comprising an inertial measurement unit (IMU) to detect a movement of the imaging device.

Embodiment 15 is the ear-worn AR device of embodiment 13 or 14, wherein the delivery component comprises at least one of an auditory notification component or a tactile notification component.

Embodiment 16 is the ear-worn AR device of any one of embodiments 13-15, further comprising a wireless component to pair with a display device, wherein the processor is further configured to deliver the augmented image to the display device.

Embodiment 17 is the ear-worn AR device of any one of embodiments 13-16, further comprising one or more sensors to collect user state data, optionally, comprising the sensors include at least one of a heartrate device, a galvanic skin response device, a thermal sensor, or a satellite-based navigation device.

Embodiment 18 is an augmented reality (AR) system embodied on a computer-readable storage medium, comprising:
  an image processing component to receive and process image data for an object of interest from an imaging device to generate an image of the object;
  a data interface component to receive sensor data from one or more sensors;
  an augmenting component to generate augmenting information to augment the image of the object, the augmenting information including at least one of visual information, or auditory information;
  a display component to overlay the visual information to the image of the object; and
  a notification component to deliver the auditory information to a notification device.

Reference throughout this specification to "one embodiment," "certain embodiments," "one or more embodiments," or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment," or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. Furthermore, various exemplary embodiments have been described. These and other embodiments are within the scope of the following claims.

What is claimed is:

1. A computer-implemented method for augmented reality (AR), the method comprising:
  obtaining, via an imaging device of an ear-worn device worn by a user, image data;
  identifying, based on one or more of preference settings associated with the user, a user history associated with the user, or a context associated with the user, an object of interest in the obtained image data, the object of interest representing a worker wearing a personal protective equipment (PPE) piece;
  generating, via a processor, an augmented image comprising generating augmenting information to be augmented onto an image of the object of interest identified in the obtained image data, the augmenting information representing one or more of a worker name, a job description, a PPE identification, or a working status associated with the worker wearing the PPE piece;
  detecting that the object of interest is in a field of view (FOV) of the imaging device; and
  in response to detecting that the object of interest is within the FOV of the imaging device, adjusting the augmented image based on results of the detection to form an adjusted augmented image in which the object of interest is re-centered.

2. The method of claim 1, wherein generating the augmenting information comprises generating visual content to overlay the image of the object of interest.

3. The method of claim 1, wherein generating the augmenting information comprises generating a non-visual content including at least one of an auditory notification or a tactile notification to be output to the user in association with the image of the object of interest.

4. The method of claim 1, wherein detecting that the object is in the FOV of the imaging device comprises detecting a head movement of the user via an inertial measurement unit (IMU).

5. The method of claim 1, further comprising delivering the adjusted augmented image to the user.

6. The method of claim 5, wherein the augmenting information comprises visual augmenting information, the method further comprising delivering the adjusted augmented image comprises displaying the image of the object of interest overlaying visual augmenting information.

7. The method of claim 1, further comprising collecting user state data via one or more sensors in communication with the ear-worn device, the sensors comprising at least one of a heartrate device, a galvanic skin response device, a thermal sensor, or a satellite-based navigation device, wherein generating the augmenting information comprises generating the augmenting information at least in part by analyzing the user state data.

8. An ear-worn augmented reality (AR) device configured to be worn by a user, the ear-worn AR device comprising:
an imaging device configured to obtain image data;
one or more processors configured to receive the image data from the imaging device, the one or more processors being configured to:
identify, based on one or more of preference settings associated with the user, a user history associated with the user, or a context associated with the user, an object of interest in the image data obtained by the imaging device, the object of interest representing a worker wearing a personal protective equipment (PPE) piece;
generate an augmented image comprising generating augmenting information to be augmented onto an image of the object of interest identified in the image data obtained by the imaging device, the augmenting information representing one or more of a worker name, a job description, a PPE identification, or a working status associated with the worker wearing the PPE piece;
determine whether the object is in a field of view (FOV) of the imaging device; and
perform one of:
in response to a determination that the object of interest is within the FOV of the imaging device, adjust the augmented image to form an adjusted augmented image in which the object of interest is re-centered, or
in response to a determination that the object of interest is not within the FOV of the imaging device, adjust the augmented image by adding the augmenting information to a historic image representing the object of interest to form the adjusted augmented image; and
a delivery component configured to deliver the adjusted augmented image to the user via the ear-worn AR device.

9. The ear-worn AR device of claim 8, further comprising an inertial measurement unit (IMU) configured to detect a movement of the imaging device.

10. The ear-worn AR device of claim 9, wherein the processing circuitry is further configured to detect a change in a viewing angle of the user via the IMU, wherein to determine whether the object is in a field of view (FOV) of the imaging device, the processing circuitry is configured to determine whether the object is in a field of view (FOV) of the imaging device based on the change in the viewing angle of the user as detected via the IMU.

11. The ear-worn AR device of claim 10, wherein to detect the change in the viewing angle of the user via the IMU, the processing circuitry is configured to combine data received from the IMU with one or more of translation information and/or rotation information associated with the user.

12. The ear-worn AR device of claim 8, wherein the delivery component comprises at least one of an auditory notification component configured to output one or auditory notifications via the ear-worn AR device, or a tactile notification component configured to output one or more tactile notifications via the ear-worn AR device.

13. The ear-worn AR device of claim 8, further comprising a wireless component configured to pair with a display device, wherein the processor is further configured to render the augmented image for display via the display device.

14. The ear-worn AR device of claim 8, further comprising one or more sensors configured to collect user state data, the one or more sensors comprising at least one of a heartrate device, a galvanic skin response device, a thermal sensor, or a satellite-based navigation device.

15. The ear-worn AR device of claim 8, further comprising a memory unit configured to store at least one of the preference settings associated with the user or the user history associated with the user.

16. An ear-worn augmented reality (AR) system embodied on a non-transitory computer-readable storage medium and configured to be worn by a user, the ear-worn AR system comprising:
an image processing component configured to receive from an imaging device and process image data to identify, based on one or more of preference settings associated with the user, a user history associated with the user, or a context associated with the user, an object of interest in the received image data to generate an image of the object of interest, the object of interest representing a worker wearing a personal protective equipment (PPE) piece;
a data interface component to receive sensor data from one or more sensors;
an augmenting component configured to generate augmenting information to augment the image of the object, the augmenting information including at least one of visual information, or auditory information, wherein the augmenting information represents one or more of a worker name, a job description, a PPE identification, or a working status associated with the worker wearing the PPE piece;
a display component configured to overlay the visual information to the image of the object;
an adjusting component configured to:
determine whether the object is in a field of view (FOV) of the imaging device; and
perform one of:
in response to a determination that the object of interest is within the FOV of the imaging device, adjust the augmented image to form an adjusted augmented image in which the object of interest is re-centered, or
in response to a determination that the object of interest is not within the FOV of the imaging device, adjust the augmented image by adding the augmenting information to a historic image representing the object of interest to form the adjusted augmented image; and
a notification component configured to deliver the adjusted augmented image the user via a notification device.

* * * * *